United States Patent [19]

Ohkawa et al.

[11] Patent Number: 4,913,072
[45] Date of Patent: Apr. 3, 1990

[54] EMBROIDERY LACE MACHINE

[75] Inventors: Koichiro Ohkawa, Higashimurayama; Itaru Nagoshi, Kawagoe; Shunji Hiranuma, Hanno, all of Japan

[73] Assignee: Hiraoka Kogyo Co., Ltd., Hanno, Japan

[21] Appl. No.: 116,841

[22] Filed: Nov. 5, 1987

[30] Foreign Application Priority Data

Nov. 6, 1986 [JP] Japan .................. 61-262745

[51] Int. Cl.$^4$ .................................. D05C 11/06
[52] U.S. Cl. .................................. 112/84; 112/221
[58] Field of Search ............ 112/84, 98, 78, 221, 112/121.11, 275, 163

[56] References Cited

U.S. PATENT DOCUMENTS

| | | | |
|---|---|---|---|
| 4,254,724 | 3/1981 | Conrads | 112/277 X |
| 4,434,728 | 3/1984 | Comploi et al. | 112/84 |
| 4,776,291 | 11/1988 | Tajima et al. | 112/221 X |

Primary Examiner—Peter Nerbun
Attorney, Agent, or Firm—Armstrong, Nikaido, Marmelstein, Kubovcik & Murray

[57] ABSTRACT

An embroidery lace machine has a plurality of mechanisms which can be brought into and out of operation by connection to and disconnection from a main drive shaft using electrically operated coupling devices 33. A single signal generating means (15) generates a reference pulse each time the driving shaft is in a reference rotational position and a train of angular position pulses indicating the rotational displacement of the shaft. Counting means (20) counts the number of angular position pulses following receipt of the reference pulse and generates a timing control signal via a one-shot device (31) and amplifier (32) to actuate each coupling device (33) when the number of angular position pulses counted by the counting means coincides with a respective preset count associated with the respective mechanism.

9 Claims, 7 Drawing Sheets

EMBROIDERY LACE MACHINE

FIELD OF THE INVENTION

This invention relates to an embroidery lace machine comprising a control apparatus for generating timing control signals for controlling the operation of a plurality of mechanisms each of which is brought into and out of operation by connection to and disconnection from a main driving shaft of the machine.

BACKGROUND OF THE INVENTION

In an embroidery lace machine having mechanisms such as needles, shuttles, thread carriers, borers, borer depth controllers and the like, it is known to control the convention of each mechanism relative to the main driving shaft by means of electrical control signals.

Each of the mechanisms to be driven is to be connected to or disconnected from the main driving shaft at a time when the rotating driving shaft reaches a predetermined angular position. This predetermined angular position or timing varies for each mechanism. It is known to obtain the required timing signals for controlling the connection and disconnection of the controlled mechanisms of the machine in two ways.

As shown in FIG. 10 of the accompanying drawings, one known way of generating the required timing signals is to provide a main driving shaft 1 of the machine with a plurality of cam dogs 2 for actuating respective detector switches 3. The cam dogs are provided in pairs with the two cam dogs of each pair respectively defining the points of connection and disconnection of a corresponding mechanism. For example, in FIG. 10, one cam dog 2A of the pair of cam dogs 2A, 2B, actuates a detector 3A associated with the connection of a needle to the driving shaft and the other cam dogs 2B actuates a detector 3B associated with the disconnection of the needle from the driving shaft. Similarly, the pair of cam dogs 2C and 2D are associated with respective detectors 3C and 3D respectively associated with the connection of a shuttle to the driving shaft and the disconnection of the shuttle from the driving shaft. The arrow 4 indicates that the main driving shaft 1 is connected to the needle, shuttle and any other controlled mechanisms driven from the driving shaft by suitable drive connections.

Another known way of generating timing signals for the connection and disconnection of the controlled mechanisms is to couple the main driving shaft with cylindrical signal generating rings having electrically conductive portions and electrically non-conductive portions constituting respective timing signal generators corresponding to the mechanisms to be controlled so that timing signals may be generated according to interruptions in electrical current picked up from the rings.

However, the prior art constructions have a drawback in that troublesome mechanical modifications, such as changing the angular positions of the cam dogs or of the rings are necessary in order to adjust or change the timing of the operation of the mechanisms driven by the driving shaft. Moreover, the accuracy with which angular positions detected in the known constructions is not good. Furthermore, the prior art constructions require as many detecting means as there are mechanisms to be driven from the driving shaft, and accordingly the system becomes complicated, giving rise to the possibility of malfunctioning.

SUMMARY OF THE INVENTION

An object of this invention is to eliminate or at least reduce the above-mentioned draw backs of the prior art and to provide an embroidery lace machine having a timing control apparatus which can accurately generate timing control signals using relatively simple means.

Accordingly, the present invention provides an embroidery lace machine in which each of a plurality of mechanisms is brought into and out of operation by connection to and disconnection from a main driving shaft of the machine at predetermined times during the rotation of the driving shaft, characterized by a signal generating device for generating a reference pulse each time the driving shaft is in a reference rotational position and for generating angular position pulses indicating the rotational displacement of the shaft from the reference position, and a counting device for counting the number of angular position pulses following the reference pulse and generating a timing control signal to actuate the operation of each mechanism when the number of angular position pulses counted by the counter coincides with a respective preset count associated with that mechanism.

The present invention enables a single rotational angle detecting device such as a rotary encoder, to be provided on the main driving shaft instead of a respective detecting device for each mechanism. As a result, timing signals for connecting and disconnecting all the mechanisms can be derived using a single rotational angle detecting device. Therefore, alteration or modification of the timing of the operation of any one of the controlled mechanisms may be effected by simply changing the preset count associated with the mechanism in question. The accuracy with which the timing is detected may also be improved relative to the accuracy of the prior art constructions.

BRIEF DESCRIPTION OF THE DRAWINGS

In order that the invention may be readily understood, embodiments thereof will now be described, by way of example, with reference to the accompanying drawings, in which.

DESCRIPTION OF THE PREFERRED EMBODIMENTS

A first embodiment of the invention will now be described with reference to FIGS. 1 to 5 and 11 of the accompanying drawings.

Figure 11:
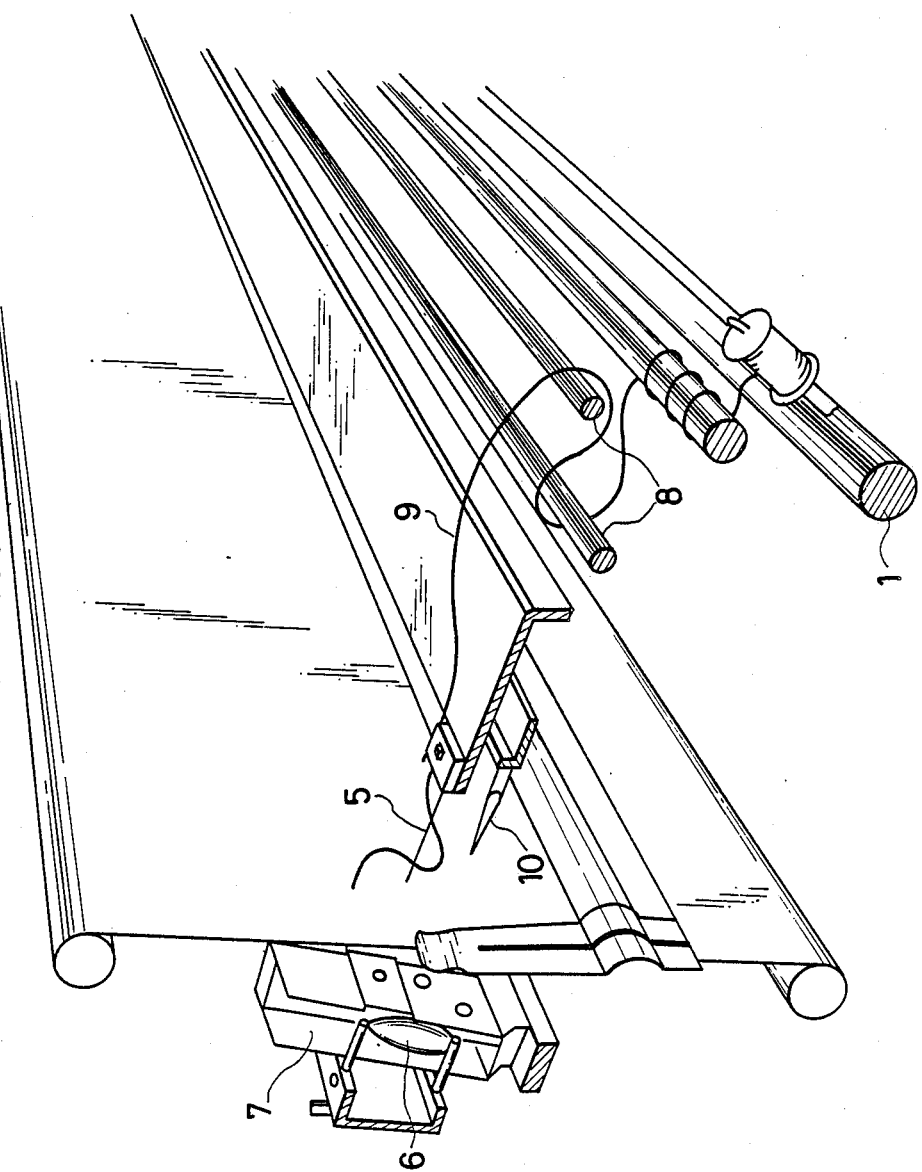
FIG. 11 is a schematic perspective view of part of an embroidery lace machine, illustrating various mechanisms operated from the main driving shaft of the machine.

Referring firstly to FIG. 11, an embroidery lace machine has a main driving shaft 1 and a plurality of mechanisms driven from the main driving shaft 1, such as a needle 5, a shuttle 6 in shuttle box 7, thread carriers 8 for a thread 9 and a borer 10. Each of the mechanisms is driven by connecting and disconnecting a respective drive coupling to the shaft with a predetermined timing relative to the rotation of the shaft 1.

Control apparatus for generating suitable timing signals for connecting the various mechanisms to and disconnecting them from the driving shaft is illustrated in FIGS. 1 to 5.

Figure 2:
FIG. 2 is a perspective view of a rotary encoder illustrated schematically in the FIG. 1 apparatus.
Figure 5:
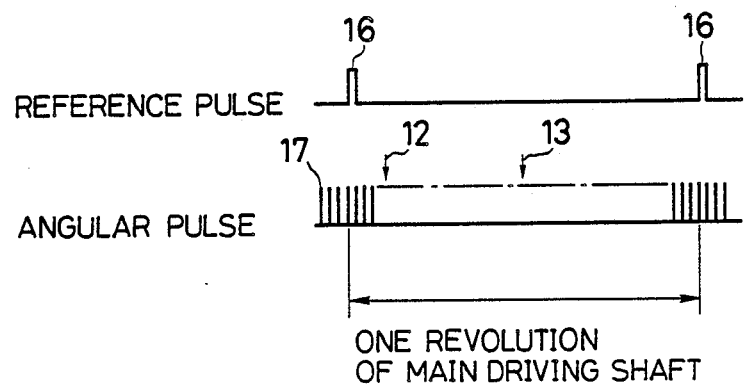
FIG. 5 illustrates the timing of output signals from the rotary encoder of the apparatus.

As shown in FIG. 2, a single rotary encoder 15 is mounted on the main driving shaft 1 of the machine and, as the driving shaft rotates, serves to generate an intermittent reference pulse signal and a continuous angular position pulse signal as the main driving shaft rotates. The drive shaft is coupled (as indicated by arrow 14) by suitable electrical couplings (not shown in FIG. 2) for connecting the mechanisms to be driven by the shaft. As can be seen from FIG. 5, a single reference pulse 16 is generated each time the main driving shaft passes through a reference rotational position, in this case the needle drawing position, for example. The continuous angular position pulse signal consists of a train of pulses 17 one of which is generated each time the main driving shaft rotates through a predetermined angle, for example one degree. If a pulse 17 is generated for each one degree rotation of the main driving shaft, then, of course, 360 such pulses 17 will be generated per revolution of the driving shaft. In FIG. 5, the timing of a needle change-over event and a shuttle change-over event are indicated by arrows 12 and 13 respectively.

Figure 1:
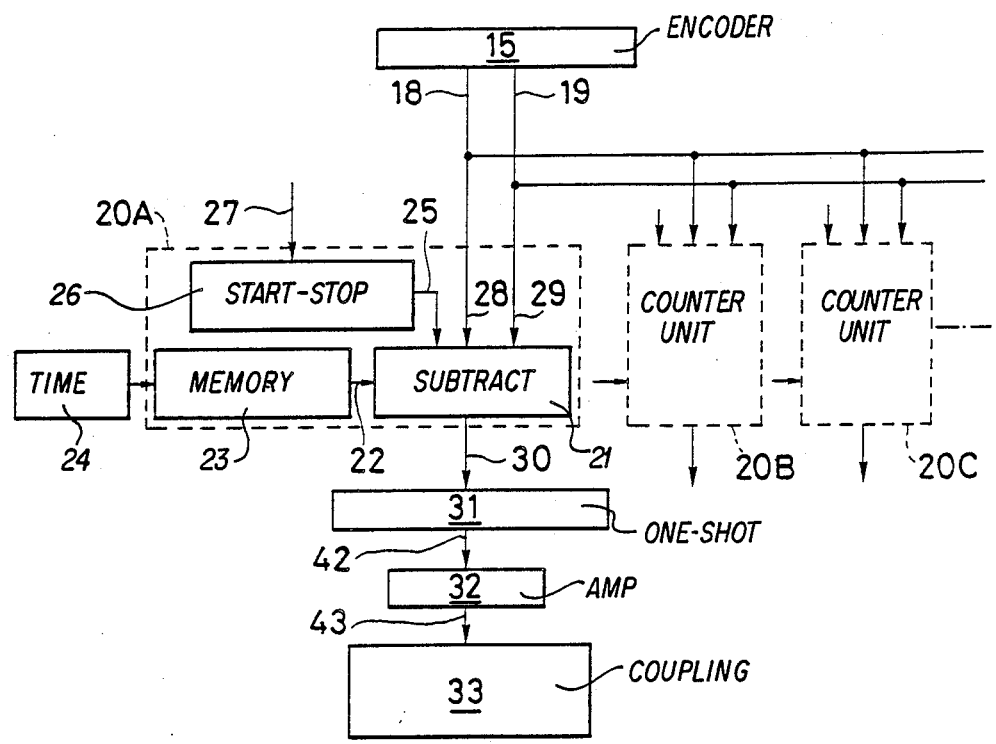
FIG. 1 is a block diagram of a timing control apparatus of a first embodiment of embroidery lace machine according to the invention.

Referring now to FIG. 1, the rotary encoder 15 has output lines 18 and 19 connected to each of a series of counter units, such as 20A, 20B and 20C, each of which corresponds to one of the mechanisms to be operated from the main driving shaft. These counter units are of identical construction and only the first counter unit 20A will therefore be described in detail.

The counter unit 20A comprises a subtraction counter 21 having a first input 22 connected to a set count memory 23 for storing a count corresponding to the number of angular pulses separating the reference position of the driving shaft and the desired timing of the operation of the respective mechanism to be driven. The count stored in the memory 23 is set by a timing setter 24 for example by means of key input. The subtraction counter 21 has a second input 25 for receiving an enabling signal from a start-stop device 26 receiving an external control signal on its input 27. The output lines 18 and 19 of the rotary encoder 15 are connected to respective third and fourth inputs 28 and 29 of the subtraction counter 21 and serve to supply such inputs respectively with the reference pulses and the angular pulses. The control signal applied to the input 27 of the device 26 is derived from the operation signals for each mechanism which exist in the pattern data for an embroidery lace machine and is input to the counter unit synchronously with or in advance of the reference pulse 16 supplied by the rotary encoder 15. The subtraction counter 21 has an output 30 connected through a one-shot circuit 31 and an amplifier 32 to an electrical coupling device 33 for connecting and disconnecting an associated mechanism of the machine to the main driving shaft 1.

The functioning of the apparatus of FIG. 1 will now be described with reference to the flow chart and timing diagrams of FIGS. 3 to 5.

Figure 3:
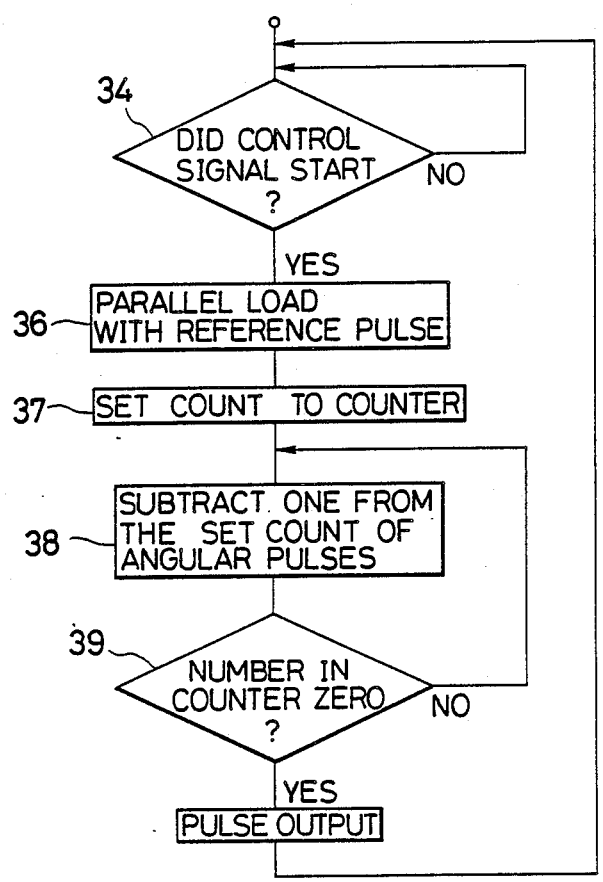
FIG. 3 is a flow-chart illustrating the operation of a counter unit in the FIG. 1 apparatus.
Figure 4:
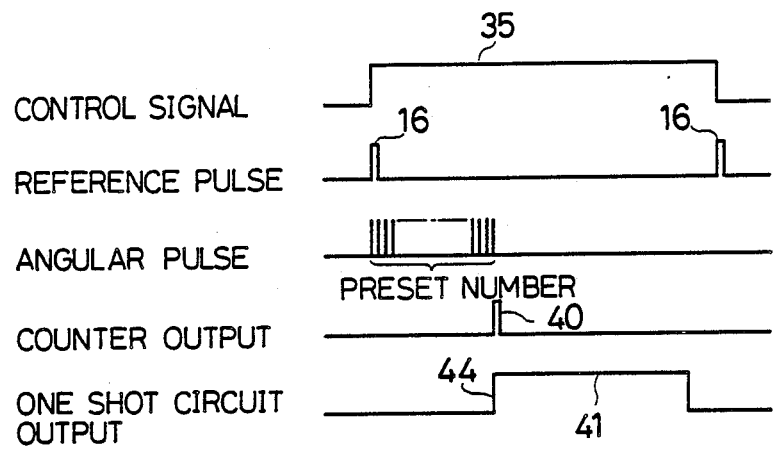
FIG. 4 illustrates various signal wave forms which occur in the FIG. 1 apparatus.

Referring to FIG. 3, in a first step 34 a control signal 35 (see FIG. 4) is applied to input 27 of the start-stop device 26, thereby causing subtraction counter 21 to be supplied with an enabling signal on line 25 to place the counter unit 20A in a stand by condition. In a second step 36, which follows or is synchronous with the application of the control signal, the reference pulse signal 16 is applied to input 28 of subtraction counter 21, and the preset count in the memory 23 is transferred to the subtraction counter in a third step 37. The subtraction counter 21 thereafter operates in a fourth step 38 to subtract a count of one from the preset count each time an angular pulse is received from the rotary encoder at input 29. In a fifth step 39, the number remaining in the subtraction counter 21 is determined and the subtraction continues until the number remaining in the counter reaches zero, whereupon an output timing pulse 40 (see FIG. 4) is delivered on output 30 of subtraction counter 21 to the one-shot circuit 31 which serves to generate a timing control signal 41 which is supplied on output 42 to amplifier 32 which delivers an amplified timing control signal on its output 43 to acutate the coupling device 33. The timing control signal 41 generated by the circuit 31 is in the form of a pulse or predetermined duration with a leading edge 44 the timing of which is determined by the timing of the counter output pulse 40.

Figure 6:
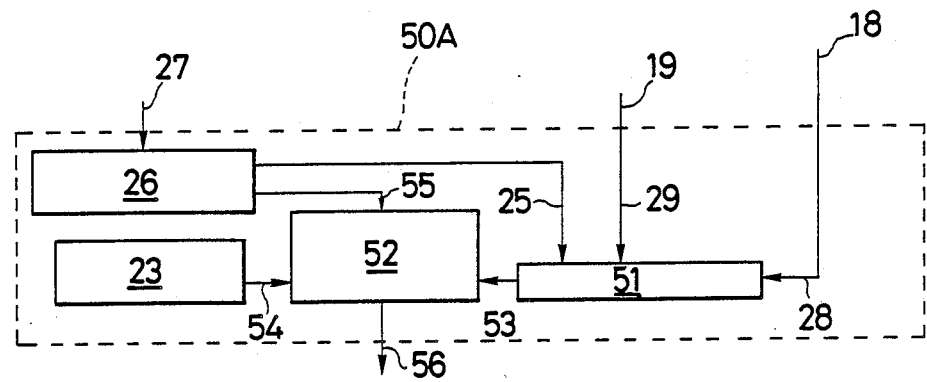
FIG. 6 is a block diagram of a counter unit employed in a second embodiment of the invention.
Figure 7:
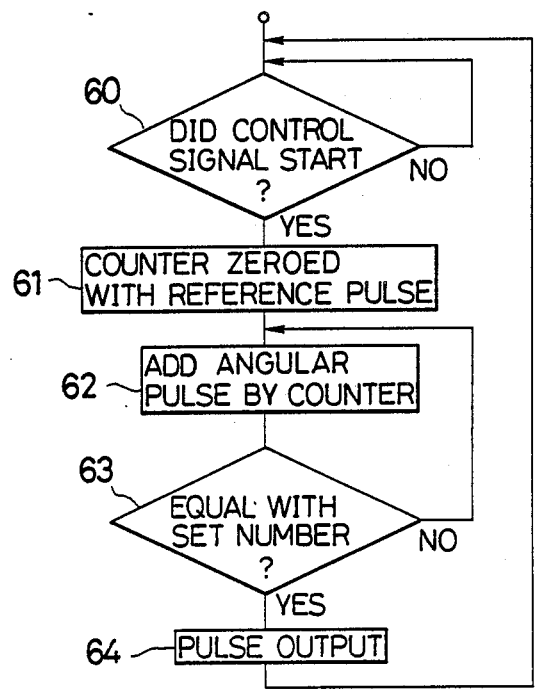
FIG. 7 is a flow-chart illustrating the operation of the counter unit of the second embodiment.

FIG. 6 illustrates a counter unit 50A of a second embodiment of the present invention, with FIG. 7 showing the operational flow chart of this second embodiment.

In FIG. 6 components which are the same as corresponding elements in the counter unit 20A are indicated by the same reference numerals. The difference between the counter units 50A and 20A is that an addition counter 51 and a comparator 52 are used in the counter unit 50A instead of the subtraction counter 21 in the counter unit 20A. The counter unit 51 still receives the reference pulses, angular pulses and enabling signals on inputs 18, 19 and 25 respectively but provides at input 53 of comparator 52 and accumulating count corresponding to the number of angular pulses counted since the receipt of the reference pulse. The comparator 52 has a second input 54 on which it receives the set count from the memory 23. A third input 55 of the comparator 52 receives an enabling signal from the start-stop device 26. An output signal of the comparator 52 is delivered on output line 56 which is, like output line 30 of subtraction counter 21 connected to the coupling mechanism 33 via one-shot circuit 31 and amplifier 32 (not shown in FIG. 6).

Referring to FIG. 7 the counter unit of FIG. 6 functions as follows:

In a first step 60, the counter unit 50A is placed in a stand-by condition by the input of a control signal to input 27 of start stop device 26. In a second step 61 the counter 51 is cleared to zero upon receipt of the reference pulse at its input 28. In a third step 62, each angular pulse received at input 29 after the reference pulse is added to the count in counter 51. In a fourth step 63 the comparator compares the preset count at its input 54 with the accumulated count at its input 53 and, if these counts are the same, acts in a fifth step 64 to deliver a timing pulse like the pulse 35 (FIG. 4) on its output 56.

Where an addition counter is used, by providing a single counter unit and signal dividing means instead of a counter unit for each mechanism, it is possible to generate timing signals for all of the mechanisms and to distribute the corresponding timing signals to the respective mechanisms.

Figure 8:
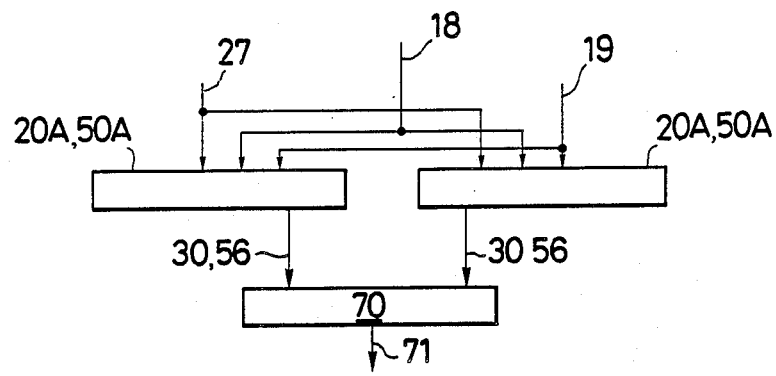
FIG. 8 is a block diagram of timing control apparatus in accordance with the third embodiment of the invention.
Figure 9:
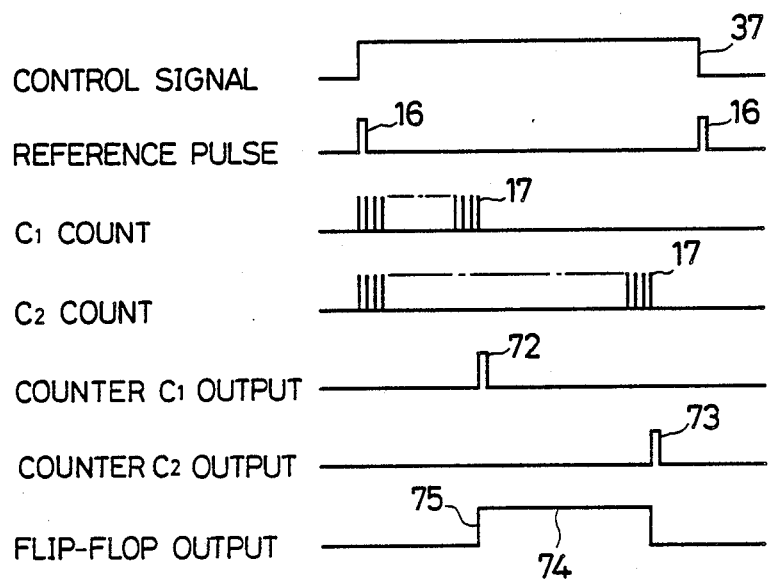
FIG. 9 is a wave form diagram illustrating the operation of the third embodiment.
Figure 10:
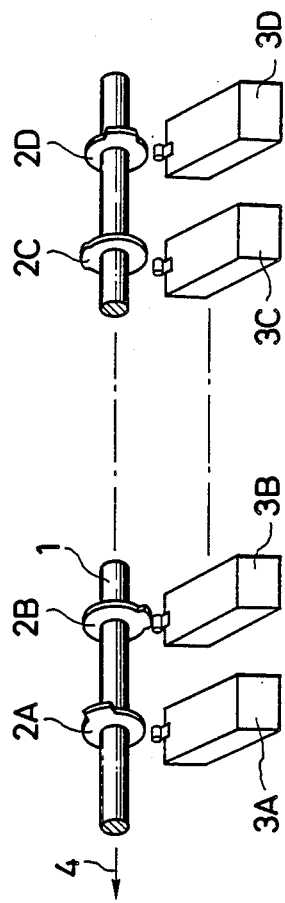
FIG. 10 is a perspective view of timing control apparatus in a prior art embroidery lace machine.

A third embodiment of the invention is illustrated by FIGS. 8 and 9.

In the first and second embodiments, setting of the duration of operation of the mechanism to be driven is determined by the length of the timing signal delivered by the one-shot circuit 35. In the third embodiment to be described, the timing of both the start and finish of the operation of the mechanism can be set independently.

As shown in FIG. 8, wherein components corresponding to a similar components in the first and second embodiments have the same reference numerals, it can be seen that the third embodiment of the invention employs a pair of first and second counter units 20A or 50A having their outputs 30 or 56 connected to respective inputs of a flip-flop 70 having an output 71 connected to the coupling mechanism of the mechanism to be actuated by an amplifier (not shown). The first counter is provided with a preset count corresponding to the timing of the beginning of the operation of the mechanism and the second counter is provided with a preset count corresponding to the timing of the ending of the operation.

Referring to FIG. 9, the two counter units are placed in stand by condition by the application of control signal 31 to input 27 and therafter the two units each count the angular pulses 17 received after reference pulse 16 and produce respective output pulses 72 and 73 when their counts reach the respective preset counts. The application of the pulses 72 and 73 to the respective inputs of the flip-flop 70 cause the flip-flop to deliver on its output 71 a timing signal 74 in the form of a pulse having the timing of its leading edge 75 determined by the pulse 72 and the timing of its trailing edge 76 determined by the pulse 73.

In the above described embodiments of the invention, a rotary encoder 15 is provided in addition to means for rotating the main driving shaft. However, if a pulse-driven motor is used to rotate the main driving shaft, the driving signals supplied to the motor may be utilised as the angular pulse signals without the need for a separate rotary encoder. In that case, however, it will be necessary to generate reference pulses separately by suitable means.

The above described embodiments of the present invention thus enable timing signals for operating individual mechanisms from the main driving shaft of an embroidery lace machine to be accurately generated without separate timing detecting means having to be provided for each mechanism, thereby simply filling the whole system. Clearly, the higher the frequency of the angular pulses, the greater the accuracy of operation. By providing suitable timing setting means, the timing of the connection and disconnection of the mechanisms may, moreover, readily be adjusted and changed.

The features disclosed in the foregoing description, in the following claims and/or in the accompanying drawings may, both separately and in any combination thereof, be material for realising the invention in diverse forms thereof.

We claim:

1. An embroidery lace machine comprising:
a plurality of different types of mechanisms including at least a needle, a shuttle, a shuttle box, a thread carrier and a borer, each mechanism being brought into and out of operation by connection to and disconnection from a main driving shaft of the embroidery lace machine at predetermined times during rotation of the main driving shaft;
a signal generating means for generating a reference pulse each time the main driving shaft is in a reference rotational position and for generating a train of angular position pulses indicating rotational displacement of the main driving shaft from the reference position; and
counting means for counting a number of angular position pulses following the reference pulse and for generating a timing control signal to separately actuate operation of each mechanism when the number of angular position pulses counted by the counting means coincides with a respective preset count associated with that mechanism.

2. A machine according to claim 1, wherein the counting means comprises, for each mechanism, a subtraction counter connected to receive the preset count from a set count memory and to receive the angular pulses from the signal generating means, the counter acting to subtract the received angular position pulses from the preset count and to produce a timing pulse when the count in the counter reaches a predetermined value.

3. A machine according to claim 2, wherein the counter produces a timing pulse when the count in a counter reaches zero.

4. A machine according to claim 1, wherein the counting means (50) comprises an additional counter (51) connected to receive the angular position pulses from the signal generating means (15), a set count memory (23) storing a set count corresponding to the desired timing of operation of the mechanism to be driven, and a comparator (52) connected to compare the contents of the addition counter and the set count memory to produce a timing pulse upon a predetermined relationship being reached between the set count and the count held by the addition counter.

5. A machine according to claim 4, wherein the comparator produces the timing pulse when the count contained in the addition counter and the set count are equal.

6. A machine according to any one of claims 2 to 5, wherein the output of the subtraction counter (21) or comparator (52) is connected to the input of a one-shot circuit (31) for delivering a pulse (41) of predetermined duration upon triggering by the timing pulse from the subtraction counter or the comparator.

7. A machine according to claim 2, comprising a pair of counting means having their outputs connected to respective inputs of a flip-flop (70) for delivery a timing signal in the form of a pulse (74) having leading (75) and trailing (76) edges the timing of which is determined by the respective output pulses 72, 73 of the two counting means.

8. A machine according to claim 1, wherein the signal generating means comprises a rotary encoder coupled to the driving shaft and generating the reference pulses and angular position pulses in response to rotation of the driving shaft.

9. A machine according to claim 1, wherein the driving shaft is rotated by means of a pulse-driven motor supplied with driving pulses from a driving pulse source and the signal generating means comprises the driving pulse source, the pulses from the source serving as the angular position pulses, and means for separately generating the reference pulses.

* * * * *